Jan. 1, 1924. 1,479,550
M. C. KRISTEK
CHUCK FOR TAPER PINS AND THE LIKE
Filed March 5, 1921
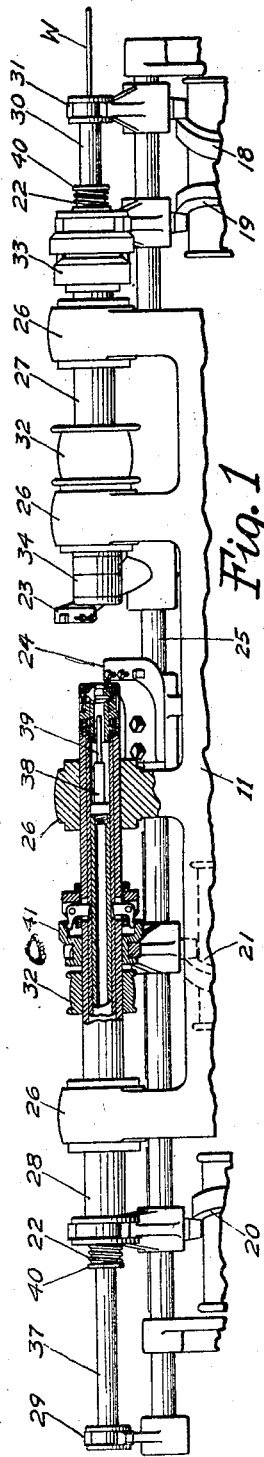
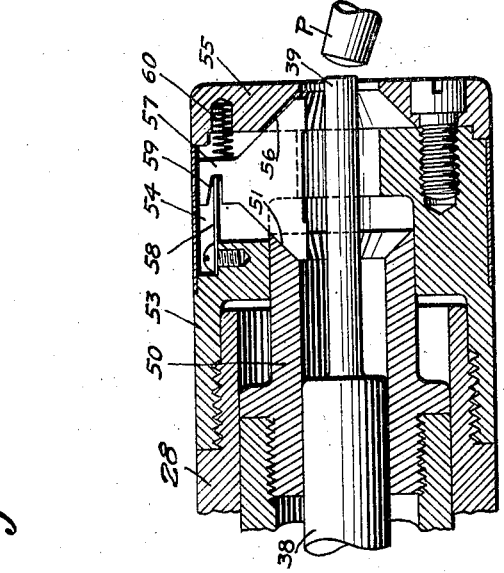
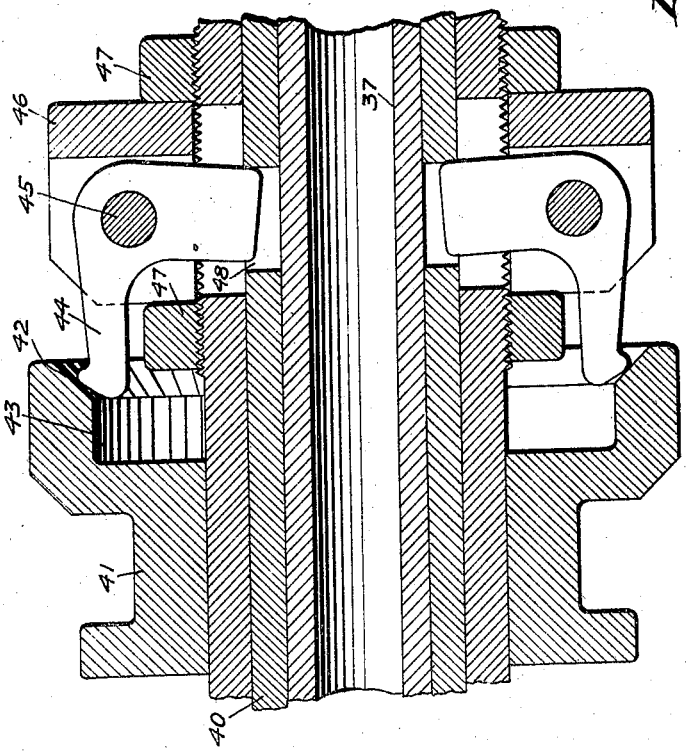
Inventor
Max C. Kristek.
By attorneys
Southgate Southgate.

Patented Jan. 1, 1924.

1,479,550

UNITED STATES PATENT OFFICE.

MARX C. KRISTEK, OF WORCESTER, MASSACHUSETTS.

CHUCK FOR TAPER PINS AND THE LIKE.

Application filed March 5, 1921. Serial No. 450,017.

*To all whom it may concern:*

Be it known that I, MARX C. KRISTEK, a citizen of Austria (who has taken out his first papers to become a citizen of the United States), residing at Worcester, in the county of Worcester and State of Massachusets, have invented a new and useful Chuck for Taper Pins and the like, of which the following is a specification.

This invention relates to a chuck capable of general use, but especially applicable to a machine for operating on wire to produce a rapid succession of articles therefrom and is particularly adapted for holding tapered pins, although with mechanical changes it can be arranged for other articles of a similar nature.

The principal objects of the invention are to provide an improved form of chuck for holding the wire or product in such a way as to firmly grip it whether the work is straight or tapered with no danger of the force of the gripping action being lost during the operation; to provide an improved means for equalizing the action of the jaws; and to provide a clutch of novel construction which will obviate the common difficulty with screw machine clutches, due to the fact that, as formerly constructed, they had elements which would be caused to fly out by centrifugal force and sometimes cause the chuck to grip the wire so as to prevent feeding of the same.

The invention also involves novel arrangements for operating the chuck and for ejecting the finished article.

Further objects and advantages of the invention will be hereinafter described and more particularly pointed out in the appended claims.

Reference is to be had to the accompanying drawing in which—

Fig. 1 is a side view partly in central longitudinal section showing a machine which involves the features of this invention; and Fig. 2 is a sectional view of the clutch and the chuck in a position for ejecting the finished article from a taper pin machine.

The invention can be applied to a taper pin making machine of the screw machine type provided with cams 18, 19 and 20 on a main cross shaft not shown but mounted on a frame 11. Although not shown here-with the machine is also provided with two other cams for operating a turning tool holder 23 and a cutting off tool holder 24. The operation of these two tool holders is accomplished by swinging them on a shaft 25 on which they are pivotally mounted. As this is well understood in the screw machine art, I have not illustrated the details. This frame 11 is provided with a number of bearings 26 in which are located two hollow shafts 27 and 28, one on the right or receiving end of the machine and the other 28 on the left. The shaft on the right, as is true with screw machines generally, is provided with an internal hollow feeding in shaft 30 rotating in an operating element 31 outside the shaft 27 and centered in that shaft. This is provided with jaws, not shown, for feeding the wire W inwardly according to the reciprocating motion given to the hollow shaft 30 by a cam 18. The shaft 27 is not longitudinally movable but is provided with a driving pulley 32 for constantly rotating it. The same is true of the shaft 28. These two shafts are rotated at the same speed.

The shaft 27 also is provided with a clutch 33 operated by the cam 19 to move back and forth and operate the chuck 34 in its end for gripping the wire. As I have shown duplicates of these two parts 33 and 34 on the other side of the machine I will not describe the details at this point.

The shaft 28 as stated has an internal hollow rod 37 fixed in a support 29. The end of this rod 37 is filled by a plug 38 which is provided with a stop 39 fixed, positively of course, to the rod 37. Mounted to move on the rod 37 is a hollow shaft 40 which is adapted to be reciprocated in the rotary shaft 28 by the cam 20. This shaft 40 is provided with means by which it is reciprocated.

Slidable on the shaft 28 is a sleeve 41 arranged to be reciprocated by a cam. This is provided with an internal conical cam surface 42 and a cylindrical surface 43 at the end of it for engaging and controlling the arms 44 of a set of jaw levers. These levers are pivoted on studs 45 in a head 46 which is fixed in position on the rotating shaft 28 by a screw threaded connection and pair of nuts 47. These jaw levers 44 are L-shaped and it is to be noted that the arms which operate them are located inside the surfaces 42 of the sleeve that control them. Therefore any increase in centrifugal force, due to excessive speed for any cause, will not act to force out these arms, or in fact, act upon them at all. The inner ends of these arms project into slots 48 in the hollow shaft 40. Therefore, the motion of these levers on their pivots 45 will control the longitudinal motion of the shaft 40 in opposition to a spring 22. This shaft 40 has screwed into its end and therefore solidly fixed thereto, a hollow plug 50. This plug has an internal conical chuck operating surface 51. It will be seen therefore that the operation of the sleeve 41 through the cam 21 controls the motion of this shaft 40 and therefore the jaws 57.

A head 53 is mounted on the end of the rotary shaft 28. It is provided with hollow spaces 54 and with an end plate 55 preferably bolted on, and open at the center to permit the entrance of the wire. The inside of this plate 55 is provided with a conical surface 56 opposite the single inside conical surface 51. Located in the three spaces 54, or in any other desired number arranged around the center, are a series of chuck jaws 57. These have conical or at least converging surfaces for engagement with the two surfaces 51 and 56. A spring 58 is provided for each one, preferably a flat spring entering a notch 59 in an extension of the jaw, for holding these jaws outwardly as far as possible. This insures their contact with the conical surfaces 51 and 56. A coil spring 60 is shown as a convenient means for holding the jaws in proper relation to the springs 58 without positively connecting these parts. The jaws are hung independently of each other and are free to swing a little either way until tightened up. This provides for equalizing them so that they will be equally efficient in clamping a cylindrical object or one tapering in either direction.

The operation of the machine is as follows: The wire is forced clear in to engage the end of the stop 39 which is stationary. The sleeve 41 now operates to move inwardly the hollow shaft 40, against the opposition of its springs. This operation takes place through the action of the cam surfaces 42 on the levers 44 as has been described. Thus the head 50 is moved forwardly so as to positively move the chuck jaws 57 inwardly to grip the wire. The particular order of the operation of the two cutting heads 23 and 24 is determined by their operating cams, the shapes of which are determined by the kind of work being operated upon. But considering a single length of wire, the cutter 23 first operates on it and, as the rotating wire moves along, the cutter swings inwardly toward the center so as to taper it. This action is produced by the operation of the cam which operates the cutter on holder 23 as is well understood. When the operation of forming a taper pin is completed and the pin cut off it is held in the chuck. The opposite hollow shaft 28 is now drawn back taking with it the shaft 40 sliding on the stationary rod 37. This brings the parts on the left back to the position shown in which the chuck is drawn back so far that the stop 39 projects beyond its end. Therefore the tapered pin P, which had been in contact with the end of this stop, is necessarily ejected and drops out. Now the parts just described move back again and the wire is moved in until the pin on its end contacts with the end of the stop 39. Then the operations are repeated.

Although I have illustrated and described only a single form of the invention I am aware of the fact that modifications can be made therein by any person skilled in the art without departing from the scope of the invention as expressed in the claims.

Therefore, I do not wish to be limited to all of the details of construction herein shown and described, but what I do claim is:—

1. In a machine of the character described, the combination of a constantly rotating external hollow shaft, an inner hollow shaft having a fixed head thereon provided with an internal slanting surface at its end, a series of independent jaws held in the end of the first named shaft and arranged around it, said first named shaft having surfaces engaging the outer walls of said jaws, the inner inclined walls of said jaws engaging said internal slanting surface, each jaw having a notch, a flat spring supported by the external shaft loosely engaging in each notch to force its jaw outwardly with a yielding action, and coil springs supported by the external hollow shaft beyond the jaws for engaging them at points opposite the flat springs to hold the jaws against the flat springs.

2. In a machine of the character described, the combination of an external constantly rotating hollow shaft, a reciprocable head on said shaft, levers extending through the shaft, a reciprocable inner hollow shaft having notches for receiving the ends of said levers, whereby said inner shaft can be moved longitudinally by the head, said inner shaft having a fixed head thereon provided with an internal conical surface at its end, a series of triangular jaws individually held in the end of the first named shaft free to move longitudinally therein and to swing, said first shaft having inclined surfaces engaging the outer inclined walls of said jaws, their inner inclined walls engaging said internal conical surface, whereby the first head will move the second head forwardly and force the jaws inwardly to effectively grip a wire or cone extending into the second head, a notch in each jaw, a spring supported by the external shaft extending into each notch to force its jaw outwardly with a yielding action, each jaw being mounted independently of its spring, and a second spring for holding the jaw in proper position with relation to the first named spring.

3. In a machine of the character described, the combination of a constantly rotating hollow shaft, an inner hollow shaft having a fixed head thereon provided with an internal conical surface at its end, a series of independent triangular jaws held in the end of the first named shaft and arranged around it, said first named shaft having inclined surfaces engaging the outer inclined walls of said jaws, their inner inclined walls engaging said internal conical surface, each jaw having a notch, and a flat spring supported by the external shaft loosely engaging each notch to force its jaw outwardly with a yielding action, said jaws being mounted independently of the springs, and yielding means for holding the jaws in proper position with relation to the flat spring.

In testimony whereof I have hereunto affixed my signature.

MARX C. KRISTEK.